United States Patent
He

(10) Patent No.: US 9,876,722 B2
(45) Date of Patent: Jan. 23, 2018

(54) DATA MULTI-STREAM TRANSMISSION METHOD AND DEVICE

(71) Applicant: ZTE Corporation, Shenzhen (CN)

(72) Inventor: Feng He, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 181 days.

(21) Appl. No.: 14/762,915

(22) PCT Filed: Sep. 17, 2013

(86) PCT No.: PCT/CN2013/083683
§ 371 (c)(1),
(2) Date: Jul. 23, 2015

(87) PCT Pub. No.: WO2014/114101
PCT Pub. Date: Jul. 31, 2014

(65) Prior Publication Data
US 2015/0372922 A1  Dec. 24, 2015

(30) Foreign Application Priority Data

Jan. 23, 2013 (CN) .......................... 2013 1 0025123

(51) Int. Cl.
*H04W 4/00* (2009.01)
*H04L 12/803* (2013.01)
(Continued)

(52) U.S. Cl.
CPC ............ *H04L 47/125* (2013.01); *H04L 45/16* (2013.01); *H04W 36/00* (2013.01)

(58) Field of Classification Search
CPC ....... H04L 47/125; H04L 45/16; H04W 36/00
See application file for complete search history.

(56) References Cited

U.S. PATENT DOCUMENTS

2005/0039101 A1* 2/2005 Torsner ................. H04L 1/1819
714/748
2008/0080516 A1* 4/2008 Sammour ............... H04L 1/165
370/394
(Continued)

FOREIGN PATENT DOCUMENTS

CN 101951689 A 1/2011
CN 102300259 A 12/2011
CN 102883440 A 1/2013

OTHER PUBLICATIONS

International Search Report for corresponding application PCT/CN2013/083683 filed Sep. 17, 2013; dated Dec. 26, 2013.

*Primary Examiner* — Clemence Han
(74) *Attorney, Agent, or Firm* — Cantor Colburn LLP

(57) ABSTRACT

A data multi-stream transmission method and device are provided. The method includes that: a sending terminal determines an offloading way of offloading the Protocol Data Unit (PDU) data in a Packet Data Convergence Protocol (PDCP) layer according to an offloading strategy; the sending terminal offloads all or part of the PDU data as offloading data from a first connection to a second connection in the offloading way, wherein the first connection and the second connection are both connections between the sending terminal and a receiving terminal; the sending terminal implements a data multi-stream processing on the offloading data in the PDCP layer, forwards the processed offloading data to a low-level layer for processing, sends the other PDU data except for the offloading data to the receiving terminal through the first connection and the processed offloading data to the receiving terminal through the second connection.

14 Claims, 8 Drawing Sheets

(51) Int. Cl.
*H04W 36/00* (2009.01)
*H04L 12/761* (2013.01)

(56) References Cited

U.S. PATENT DOCUMENTS

| | | | | |
|---|---|---|---|---|
| 2011/0275359 | A1* | 11/2011 | Sebire | H04L 5/001 |
| | | | | 455/422.1 |
| 2013/0088960 | A1* | 4/2013 | Bi | H04L 1/1841 |
| | | | | 370/235 |
| 2013/0088979 | A1* | 4/2013 | Bi | H04B 7/024 |
| | | | | 370/252 |
| 2013/0176988 | A1* | 7/2013 | Wang | H04W 28/08 |
| | | | | 370/331 |
| 2013/0329583 | A1* | 12/2013 | Vrzic | H04W 36/30 |
| | | | | 370/252 |
| 2014/0010207 | A1* | 1/2014 | Horn | H04W 36/165 |
| | | | | 370/332 |
| 2014/0023015 | A1* | 1/2014 | Frederiksen | H04L 5/001 |
| | | | | 370/329 |
| 2014/0204771 | A1* | 7/2014 | Gao | H04W 36/28 |
| | | | | 370/252 |
| 2014/0321282 | A1* | 10/2014 | Pragada | H04W 36/0072 |
| | | | | 370/235 |
| 2015/0215971 | A1* | 7/2015 | Korhonen | H04L 69/167 |
| | | | | 370/329 |
| 2015/0327236 | A1* | 11/2015 | Lin | H04W 76/022 |
| | | | | 370/329 |

* cited by examiner

DATA MULTI-STREAM TRANSMISSION METHOD AND DEVICE

TECHNICAL FIELD

The disclosure relates to the communication field and more particularly to a data multi-stream transmission method and device.

BACKGROUND

With the continuous evolution of wireless communication technologies and standards, mobile packet services develop significantly, and the data throughout capacity of a single terminal is being improved continuously. Taking Long Term Evolution (LTE) system as example, data transmission at a maximum downlink rate of 100 Mbps can be supported in a 20M bandwidth, and in the successive LTE advanced network, data transmission rate will be further increased, even up to 1 Gbps.

FIG. 1 is a schematic diagram illustrating an LTE user-plane protocol stack according to the conventional art, as shown in FIG. 1, the downlink data received from a core network via a GPRS Tunneling Protocol for the User Plane (GTP-U) is unpacked, processed by a Packet Data Convergence Protocol (PDCP) sub-layer, a Radio Link Control (RLC) protocol sub-layer, a Medium Access Control (MAC) protocol sub-layer and a Physical (PHY) layer and then sent to a User Equipment (UE), the sending of uplink data is an inverse process. At present, as the data transmission link between a network and a UE is a one-to-one dedicated link, the signal quality of the link and the resources occupied by the link decide the performance of the data transmission between the network and the UE. If the resources used by the link are limited or the signal quality of the link is poor, then the user experience of the UE is degraded, that is the big challenge mobile operators are facing, although network capacity is being continuously increased, the increase still cannot keep up with the increase in the number of user terminals or meet the demand of the users for data traffic.

To meet the increasing demand for data services while taking the unequal distribution of services in different regions into consideration, when deploying a new generation communication network (e.g. LTE), the operator adds Lower Power Node (LPN) (or referred to as Small Cell) to enhance hotspots. The increase of LPN cells complicates network deployment environment and gives rise to some problems. Although remarkably smaller in coverage range than Macro cells, LPN cells outnumber Macro cells, thus, frequent inter-cell handover occurs when a UE or terminal moves in a network, causing problems of frequent data services or even the call drop of a terminal which further lead to the reduction of the data throughout capacity of the user and the degradation of user experience. Meanwhile, the frequent handover also causes a large signaling impact to the terminal and the network (especially a core network), which may lead to the resource congestion or even the paralysis of a system. Moreover, the foregoing situation will get worse and worse as there are more and more LPN cells deployed by the operator and individuals.

No effective solution has been proposed to address the problem existing in the conventional art that the increase of the LPN cells deployed by the operator and individuals leads to the reduction of the data throughout of the user and the resource congestion or even the paralysis of a system.

SUMMARY OF THE INVENTION

A data multi-stream transmission method and device are provided in the disclosure to at least address the problems above.

In accordance with one aspect of the disclosure, a data multi-stream transmission method is provided, including that: a sending terminal determines an offloading way of offloading the Protocol Data Unit (PDU) data of a Packet Data Convergence Protocol (PDCP) layer according to an offloading strategy; the sending terminal offloads all or part of the PDU data as offloading data from a first connection to a second connection in the offloading way, wherein the first connection and the second connection are both connections between the sending terminal and a receiving terminal; the sending terminal implements a data multi-stream processing on the offloading data in the PDCP layer, forwards the processed offloading data to a low-level layer for processing, sends the other PDU data except for the offloading data to the receiving terminal through the first connection and the processed offloading data to the receiving terminal through the second connection.

Preferably, after the sending terminal sends the other PDU data except for the offloading data to the receiving terminal through the first connection and the processed offloading data to the receiving terminal through the second connection, the method further includes that: the sending terminal collects sending status information on the data on the first connection and/or the second connection, the sending status information including: the sequence number of a packet, indication information indicating whether or not the packet is successfully sent and delay information for sending the packet.

Preferably, after the sending terminal sends the other PDU data except for the offloading data to the receiving terminal through the first connection and the processed offloading data to the receiving terminal through the second connection, the method further includes that: the sending terminal receives the receiving status information which is sent by the receiving terminal through the first connection and/or the second connection to indicate a data receiving status, the receiving status information including: the sequence number of a packet and indication information indicating whether or not the packet is successfully received.

Preferably, the data multi-stream processing implemented by the sending terminal on the offloading data includes: caching data, repacking data in a specified way, assigning a sequence number to a packet, encrypting data, protecting integrity, compressing data and adding a packet head.

Preferably, after the sending terminal sends the other PDU data except for the offloading data to the receiving terminal through the first connection and the processed offloading data to the receiving terminal through the second connection, the method further includes that: the receiving terminal implements a data multi-stream processing on the processed offloading data and the other PDU data received, wherein the data multi-stream processing implemented by the receiving terminal on the processed offloading data and the other PDU data includes: caching data, sorting data in a specified manner, assigning a sequence number to a packet, decrypting data, protecting integrity, decompressing data and removing a packet head Preferably, the offloading strategy includes: indication indicating whether or not to offload the PDU data, indication indicating the assignment of the other PDU data to the first connection and indication indicating the assignment of the offloading data to the second connection, wherein the offloading strategy is made by the sending terminal according to the following information: the feedback information collected by the network node where the sending terminal is located or by the receiving terminal and information related to connections and resources.

Preferably, after the sending terminal determines a offloading way of offloading the PDU data of a PDCP layer according to a offloading strategy, the method further includes that: the sending terminal sends the offloading strategy to the receiving terminal.

In accordance with another aspect of the disclosure, a data multi-stream transmission device located at a sending terminal is provided, including: a determination component configured to determine a offloading way of offloading the Protocol Data Unit (PDU) data of a Packet Data Convergence Protocol (PDCP) layer according to a offloading strategy; a offloading component configured to offload all or part of the PDU data as offloading data from a first connection to a second connection in the offloading way, wherein the first connection and the second connection are both connections between the sending terminal and a receiving terminal; a processing component configured to implement a data multi-stream processing on the offloading data in the PDCP layer and forward the processed offloading data to a low-level layer for processing; and a first sending component configured to send the other PDU data except for the offloading data to the receiving terminal through the first connection and the processed offloading data to the receiving terminal through the second connection after the low-level layer of the processing component completes the processing.

Preferably, the device further includes: a collection component configured to collect, after the first sending component sends the other PDU data and the processed offloading data to the receiving terminal, the sending status information on the data on the first connection and/or the second connection, the sending status information including: the sequence number of a packet, indication information indicating whether or not the packet is successfully sent and delay information for sending the packet.

Preferably, the device further includes: a receiving component configured to receive, after the first sending component sends the other PDU data and the processed offloading data to the receiving terminal, the receiving status information which is sent by the receiving terminal through the first connection and/or the second connection to indicate a data receiving status, the receiving status information including: the sequence number of a packet and indication information indicating whether or not the packet is successfully received.

Preferably, the data multi-stream processing implemented by the processing component on the offloading data includes: caching data, repacking data in a specified way, assigning a sequence number to a packet, encrypting data, protecting integrity, compressing data and adding a packet head.

Preferably, the offloading strategy includes: indication indicating whether or not to offload the PDU data, indication indicating the assignment of the other PDU data to the first connection and indication indicating the assignment of the offloading data to the second connection, wherein the offloading strategy is made by the sending terminal according to the following information: the feedback information collected by the network node where the sending terminal is located or by the receiving terminal and information related to connections and resources.

Preferably, the device further includes: a second sending component configured to send the offloading strategy to the receiving terminal after the determination component determines a offloading way according to the offloading strategy.

In accordance with still another aspect of the disclosure, a data multi-stream transmission device located at a receiving terminal is provided, including: a receiving component configured to receive, after a sending terminal determines a offloading way of offloading the Protocol Data Unit (PDU) data of a Packet Data Convergence Protocol (PDCP) layer according to a offloading strategy, offloads all or part of the PDU data as offloading data from a first connection to a second connection in the offloading way, implements a data multi-stream processing on the offloading data in the PDCP layer and forwards the processed offloading data to a low-level layer for processing, the other PDU data, except for the offloading data, sent by the sending terminal through the first connection and the processed offloading data sent by the sending terminal through the second connection, wherein the first connection and the second connection are both connections between the sending terminal and the receiving terminal.

Preferably, the device further includes: a sending component configured to send, after the receiving component receives the other PDU data and the processed offloading data, receiving status information to the sending terminal through the first connection and/or the second connection to indicate a data receiving status, the receiving status information including: the sequence number of a packet and indication information indicating whether or not the packet is successfully received.

Preferably, the device further includes: a processing component configured to implement a data multi-stream processing on the other PDU data and processed offloading data received by the receiving component, wherein the data multi-stream processing includes: caching data, sorting data in a specified manner, assigning a sequence number to a packet, decrypting data, protecting integrity, decompressing data and removing a packet head.

Preferably, the offloading strategy includes: indication indicating whether or not to offload the PDU data, indication indicating the assignment of the other PDU data to the first connection and indication indicating the assignment of the offloading data to the second connection, wherein the offloading strategy is made by the sending terminal according to the following information: the feedback information collected by the network node where the sending terminal is located or by the receiving terminal and information related to connections and resources.

Preferably, the receiving component is further configured to receive the offloading strategy sent from the sending terminal after the sending terminal determines a offloading way according to the offloading strategy.

In the disclosure, the PDU data to be transmitted on a first connection between a sending terminal and a receiving terminal is partially or totally offloaded to a second connection between the sending terminal and the receiving terminal, and the sending terminal implements a data multi-stream processing on the offloaded PDU data in a PDCP layer, transparently forwards the processed offloading data to a low-level layer and sends the offloaded PDU data to the receiving terminal through the second connection, thus addressing the problem existing in the conventional art that the data throughout of a user is reduced and system resources are congested due to the increase of the LPN cells deployed by the operator or individuals and consequentially guaranteeing the continuity of data services through the offloading of user data to another connection and improving the data service performance of the user and user experience.

BRIEF DESCRIPTION OF THE DRAWINGS

The accompanying drawings described here are provided for a better understanding of the invention and form one part of the invention, and the exemplary embodiments of the disclosure and the description thereof are illustrative of the invention but are not to be construed as limiting the invention. In the accompanying drawings.

DETAILED DESCRIPTION OF THE EMBODIMENTS

The disclosure is described below in detail with reference to accompanying drawings when read in conjunction with embodiments. It should be noted that embodiments of the disclosure and the features thereof can be combined with each other if no conflict is caused.

Figure 1:
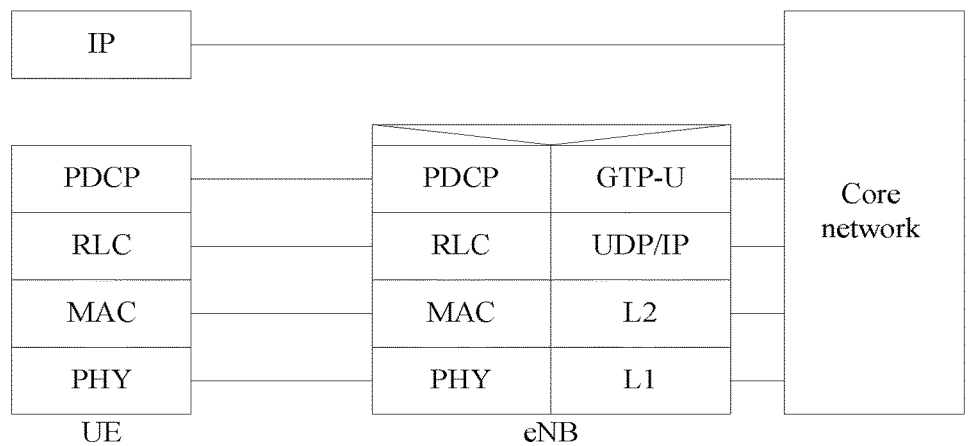
FIG. 1 is a schematic diagram illustrating an LTE user-plane protocol stack according to the conventional art.
Figure 2:
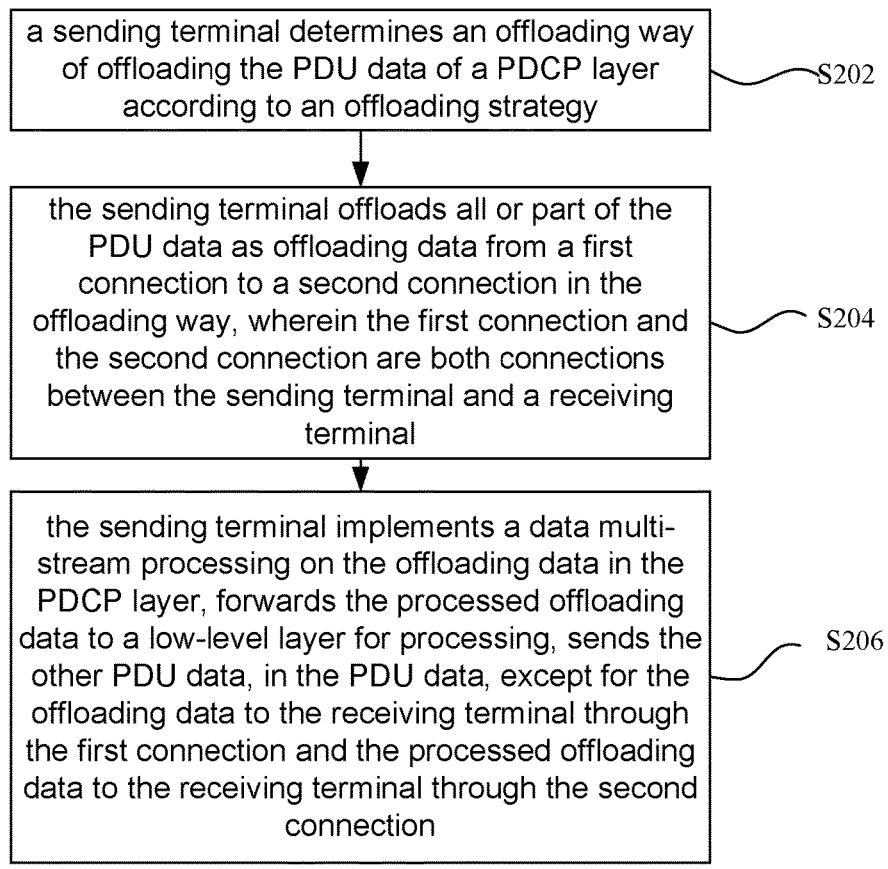
FIG. 2 is a flowchart illustrating a data multi-stream transmission method according to an embodiment of the disclosure.

FIG. 2 is a flowchart illustrating a data multi-stream transmission method according to the embodiment, and as shown in FIG. 2, the method mainly includes the following steps (Steps S202-S206).

Step S202: a sending terminal determines an offloading way of offloading the PDU data of a PDCP layer according to an offloading strategy.

Step S204: the sending terminal offloads all or part of the PDU data as offloading data from a first connection to a second connection in the offloading way, wherein the first connection and the second connection are both connections between the sending terminal and a receiving terminal.

Step S206: the sending terminal implements a data multi-stream processing on the offloading data in the PDCP layer, forwards the processed offloading data to a low-level layer for processing, sends the other PDU data, in the PDU data, except for the offloading data to the receiving terminal through the first connection and the processed offloading data to the receiving terminal through the second connection.

In the embodiment, after Step 206 is executed, the sending terminal may collect sending status information about sending data on the first connection and/or the second connection, the sending status information including: sequence number of a packet, indication information indicating whether or not the packet is successfully sent and delay information for sending the packet.

In the embodiment, after Step S206, the method further includes that: the sending terminal receives the receiving status information which is sent by the receiving terminal through the first connection and/or the second connection to indicate a data receiving status, the receiving status information including: the sequence number of a packet and indication information indicating whether or not the packet is successfully received.

Preferably, the data multi-stream processing implemented by the sending terminal on the offloading data includes: caching data, repacking data in a specified way, assigning a sequence number to a packet, encrypting data, protecting integrity, compressing data and adding a packet head.

In the embodiment, after Step S206, the method further includes that: the receiving terminal implements a data multi-stream processing on the processed offloading data and the other PDU data received, wherein the data multi-stream processing implemented by the receiving terminal on the processed offloading data and the other PDU data includes: caching data, sorting data in a specified manner, assigning a sequence number to a packet, decrypting data, protecting integrity, decompressing data and removing a packet head.

Preferably, the offloading strategy includes: indication indicating whether or not to offload the PDU data, indication indicating assignment of the other PDU data to the first connection and indication indicating assignment of the offloading data to the second connection, wherein the offloading strategy is made by the sending terminal according to the following information: feedback information collected by the network node where the sending terminal is located or by the receiving terminal and information related to connections and resources.

In the embodiment, after Step 202 is executed, the sending terminal may further send the offloading strategy to the receiving terminal.

The data multi-stream transmission method provided in the foregoing embodiment is described briefly below with reference to FIG. 3.

Figure 3:
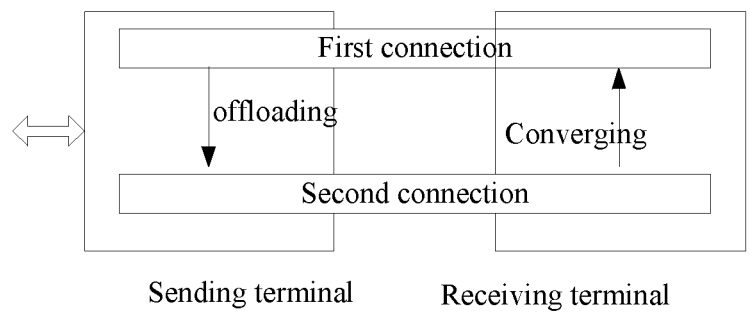
FIG. 3 is a flowchart illustrating data multi-stream transmission according to a preferred embodiment of the disclosure.

FIG. 3 is a schematic diagram illustrating data multi-stream transmission according to a preferred embodiment of the disclosure, and as shown in FIG. 3, a sending terminal may realize the offloading of the PDU data of a PDCP layer according to an offloading strategy to offload all or part of the PDU data from a first connection to a second connection and sends the offloading data to a receiving terminal, wherein feedback information about a data sending status may be selectively transmitted through the first connection or the second connection; the receiving terminal converges the data received through the second connection and that received through the first connection to obtain the final data; and optionally, the receiving terminal may feed back a data receiving status to the sending terminal through the first connection and/or the second connection.

The offloading strategy is made by the sending terminal according to the feedback information collected from the network node where the sending terminal is located or from the receiving terminal and other information related to connections and resources. Apparently, the offloading strategy may be made in many other ways in the actual application; moreover, the offloading strategy mainly decides whether or not to offload data and the assignment of offloading data packets to two connections. The data receiving status or the data sending status refers to information indicating whether or not a data packet is successfully received or sent.

Figure 4:
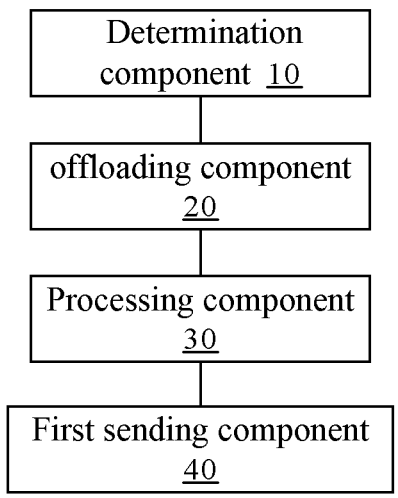
FIG. 4 is a block diagram illustrating the structure of a data multi-stream transmission device located at a sending terminal according to an embodiment of the disclosure.

FIG. 4 is a block diagram illustrating the structure of a data multi-stream transmission device located at a sending terminal according to an embodiment of the disclosure, the data multi-stream transmission device located at a sending terminal is configured to realize the data multi-stream transmission method provided in the foregoing embodiment, and as shown in FIG. 4, the data multi-stream transmission device includes: a determination component 10, an offloading component 20, a processing component 30 and a first sending component 40. The determination component 10 is configured to determine an offloading way of offloading the PDU data of a PDCP layer according to an offloading strategy; the offloading component 20 is connected with the determination component 10 and configured to offload all or part of the PDU data as offloading data from a first connection to a second connection in the offloading way, wherein the first connection and the second connection are both connections between the sending terminal and a receiving terminal; a processing component 30 connected with the offloading component 20 and configured to implement a data multi-stream processing on the offloading data in the PDCP layer and forward the processed offloading data to a low-level layer for processing; and a first sending component 40 connected with the processing component 30 and configured to send the other PDU data except for the offloading data to the receiving terminal through the first connection and the processed offloading data to the receiving terminal through the second connection after the low-level layer of the processing component 30 completes the processing.

Figure 5:
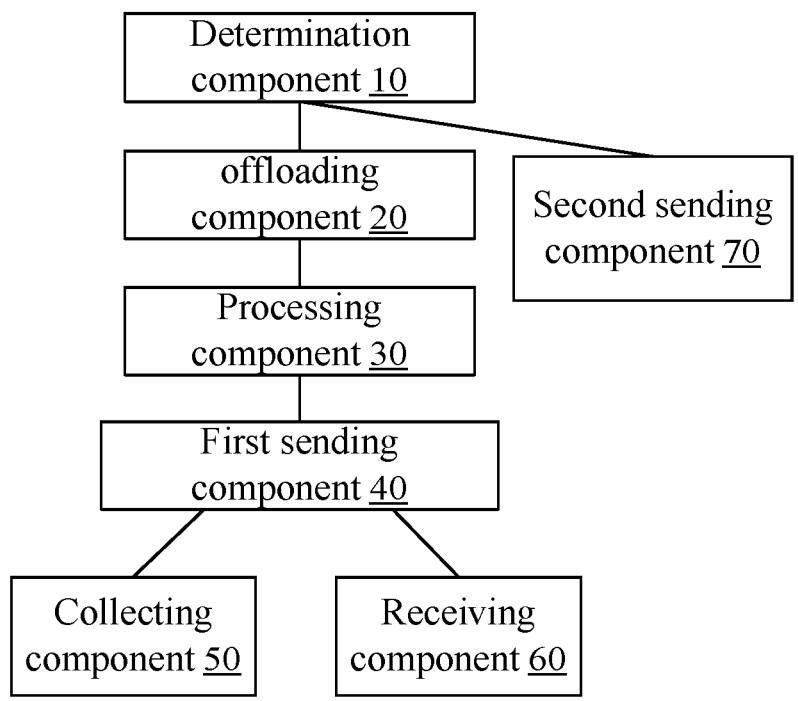
FIG. 5 is a block diagram illustrating the structure of a data multi-stream transmission device located at a sending terminal according to a preferred embodiment of the disclosure.

FIG. 5 is a block diagram illustrating a structure of a data multi-stream transmission device located at a sending terminal according to a preferred embodiment of the disclosure, in a preferred embodiment, and as shown in FIG. 5, the data multi-stream transmission device further includes: a collection component 50 connected with the first sending component 40 and configured to collect, after the first sending component 40 sends the other PDU data and the processed offloading data to the receiving terminal, sending status information on the data on the first connection and/or the second connection, the sending status information including: sequence number of a packet, indication information indicating whether or not the packet is successfully sent and delay information for sending the packet.

In a preferred embodiment, the data multi-stream transmission device further includes: a receiving component 60 connected with the first sending component 40 and configured to receive, after the first sending component 40 sends the other PDU data and the processed offloading data to the receiving terminal, the receiving status information which is sent by the receiving terminal through the first connection and/or the second connection and indicates a data receiving status, the receiving status information including: sequence number of a packet and indication information indicating whether or not the packet is successfully received.

In a preferred embodiment, the data multi-stream processing implemented by the processing component 30 on the offloading data includes: caching data, repacking data in a specified way, assigning a sequence number to a packet, encrypting data, protecting integrity, compressing data and adding a packet head.

In a preferred embodiment, the offloading strategy includes: indication indicating whether or not to offload the PDU data, indication indicating the assignment of the other PDU data to the first connection and indication indicating the assignment of the offloading data to the second connection, wherein the offloading strategy is made by the sending terminal according to the following information: the feedback information collected by the network node where the sending terminal is located or by the receiving terminal and information related to connections and resources.

Preferably, the data multi-stream transmission device further includes: a second sending component 70 connected with the determination component 10 and configured to send the offloading strategy to the receiving terminal after the determination component 10 determines an offloading way according to the offloading strategy.

Figure 6:
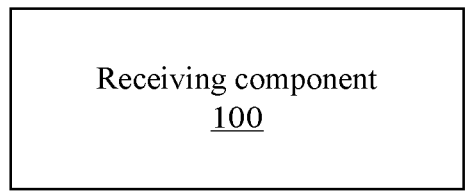
FIG. 6 is a block diagram illustrating the structure of a data multi-stream transmission device located at a receiving terminal according to an embodiment of the disclosure.

FIG. 6 is block diagram illustrating a structure of a data multi-stream transmission device located at a receiving terminal according to an embodiment of the disclosure, and as shown in FIG. 6, the data multi-stream transmission device located at a receiving terminal includes: a receiving component 100 configured to receive, after a sending terminal determines an offloading way of offloading the PDU data of a PDCP layer according to a offloading strategy, offloads all or part of the PDU data as offloading data from a first connection to a second connection in the offloading way, implements a data multi-stream processing on the offloading data in the PDCP layer and forwards the processed offloading data to a low-level layer for processing, the other PDU data, except for the offloading data, sent by the sending terminal through the first connection and the processed offloading data sent by the sending terminal through the second connection, wherein the first connection and the second connection are both connections between the sending terminal and the receiving terminal.

Figure 7:
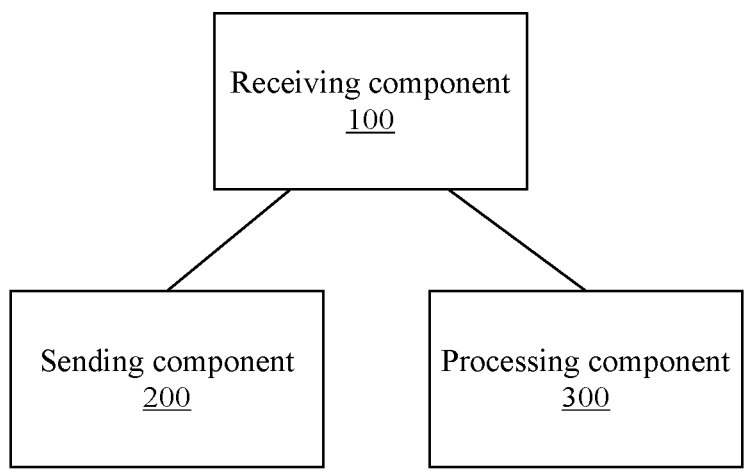
FIG. 7 is a block diagram illustrating the structure of a data multi-stream transmission device located at a receiving terminal according to a preferred embodiment of the disclosure.

FIG. 7 is a block diagram illustrating a structure of a data multi-stream transmission device located at a receiving terminal according to a preferred embodiment of the disclosure, in the preferred embodiment, as shown in FIG. 7, the data multi-stream transmission device further includes: a sending component 200 connected with the receiving component 100 and configured to send, after the receiving component 100 receives the other PDU data and the processed offloading data, receiving status information indicating a data receiving status to the sending terminal through the first connection and/or the second connection, the receiving status information including: sequence number of a packet and indication information indicating whether or not the packet is successfully received.

In a preferred embodiment, the data multi-stream transmission device further includes: a processing component 300 connected with the receiving component 100 and configured to implement a data multi-stream processing on the other PDU data and processed offloading data received by the receiving component, wherein the data multi-stream processing includes: caching data, sorting data in a specified manner, assigning a sequence number to a packet, decrypting data, protecting integrity, decompressing data and removing a packet head.

In a preferred embodiment, the offloading strategy includes: indication indicating whether or not to offload the PDU data, indication indicating the assignment of the other PDU data to the first connection and indication indicating the assignment of the offloading data to the second connection, wherein the offloading strategy is made by the sending terminal according to the following information: the feedback information collected by the network node where the sending terminal is located or by the receiving terminal and information related to connections and resources.

In a preferred embodiment, the receiving component 100 is further configured to receive the offloading strategy sent from the sending terminal after the sending terminal determines the offloading way according to the offloading strategy.

The data multi-stream transmission method provided in the foregoing embodiments is described below in detail with reference to FIG. 8 to FIG. 13 when read in conjunction with preferred embodiments 1 to 4.

First, it should be noted that in the actual application, the data multi-stream transmission devices provided in the foregoing embodiments may be absolutely constructed in other ways and configured to achieve the data multi-stream transmission method provided in the foregoing embodiments.

For example, the data multi-stream transmission devices involved in the following preferred embodiments or embodiments, although different from those provided in the foregoing embodiments in both structure and the name of each functional component, are still capable of realizing the data multi-stream transmission method provided in the foregoing embodiments.

Figure 8:
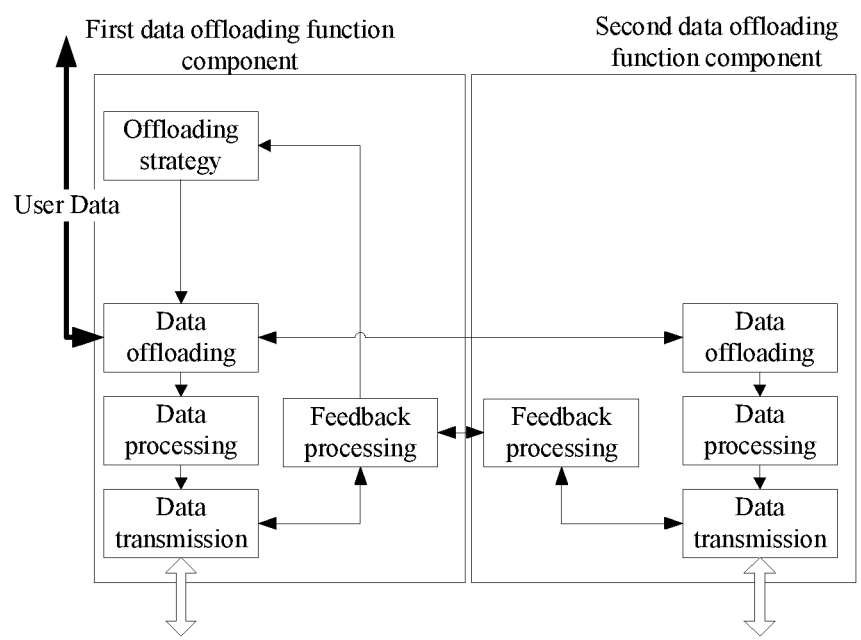
FIG. 8 is a flowchart illustrating the cooperation of data multi-stream function components according to a preferred embodiment of the disclosure.

FIG. 8 is a schematic diagram illustrating the cooperation of data multi-stream function components according to a preferred embodiment of the disclosure, and as shown in FIG. 8, the data multi-stream transmission devices provided in the foregoing embodiments may achieve a cooperative transmission through the following components:

a first data multi-stream function component located on the first connection and including one or more of the following functional sub-components: (1) a first offloading strategy component configured to determine the offloading way of a PDCP PDU, for example, determine whether or not to offload data, offload which data and offload how much data to an LPN: (2) a first data processing component configured to realize a further data processing to facilitate the subsequent transmission; (3) a first data offloading component configured to offload or combine user data; (4) a first feedback processing component configured to collect the sending or receiving status of the data on the current connection or the second connection and transmit feedback information to other components; and (5) a first data transfer component configured to receive data from or sent data to a terminal.

The first offloading strategy component may determine an offloading way according to the feedback from the user or an operator-made strategy (e.g. user type, the load of a NodeB, wireless environment), for example, the first offloading strategy component determines an offloading way of offloading the PDCP PDU of all the data corresponding to a certain Data Radio Bearer (DRB) to the second data multi-stream function component or offloading part of DPCP PDU of the DRB to the second data multi-stream function component.

In the actual application, the first offloading strategy component may instruct the first offloading component to send a specified PDCP PDU to the second data multi-stream function component, wherein the data may be optionally processed by the first data processing component.

The processing implemented by the first data processing component includes: caching data, repacking and resorting data in a specified way, assigning a sequence number to a packet, or encrypting and decrypting data and protecting and authenticating integrity, compressing and decompressing data and adding or removing a packet head.

The first data offloading component divides the original PDCP PDU data into one or more data streams according to the instruction of the first offloading strategy component and realizes the route transmission of the data or combines a plurality of data streams into one PDCP PDU data stream and transfers the one data stream through a route.

Optionally, to guarantee the transmission synchronization of a plurality of data streams, the first data offloading component needs to have a data stream transmission control function; the first data offloading component further has a stream control function and/or a sorting function.

Further, to achieve a data processing in the second data multi-stream function component and the normal data transmission between data offloading components at two nodes, other auxiliary information of a packet, for example, the SN of the packet and information indicating the retransmission or the initial transmission of the packet, may further be transferred between the first data offloading component and the second data offloading component.

Further, the first feedback processing component collects feedback information from the first data transfer component of the sending terminal and/or the second feedback transfer component of the second data multi-stream function component and/or the feedback processing component of the receiving terminal, wherein the feedback information includes: the number information of a data PDU, a sending or receiving status indicating whether or not data is successfully sent or received, the retransmission times of a PDCP packet and information indicating whether or not the PDCP packet is retransmitted or transmitted for the first time; meanwhile, the first feedback processing component further transfers the feedback information to other components, for example, indicates the loss of a packet by a terminal for the first data transfer component of the sending terminal so that the lost packet may be retransmitted or transmits the packet receiving status of the terminal to the first offloading strategy component of the sending terminal so that the first offloading strategy component may update the offloading strategy in real time.

Optionally, as shown in FIG. 8, a data multi-stream transmission device provided in an embodiment may include: a second data multi-stream function component located on the second connection and including one or more of the following functional components: (1) a second data processing component configured to realize a further data processing to facilitate a subsequent transmission; (2) a second data offloading component configured to send data to the first data multi-stream function component or receive data from the first data multi-stream function component; (3) a second feedback processing component configured to collect feedback information on the data sending or receiving status of the node where the second feedback processing component is located and/or the first data multi-stream function component and transmit usable feedback information to other components: and (4) a second data transfer component configured to transmit data with a low-layer protocol.

The processing implemented by the second data processing component includes: caching data, repacking and resorting data in a specified way, assigning a sequence number to a packet, encrypting and decrypting data and protecting and authenticating integrity, compressing and decompressing data and adding or removing a packet head.

The second data offloading component receives data from the first data multi-stream function component and transfers the received data to other components or transmits data from other components to the first data multi-stream function component.

Optionally, to guarantee the transmission synchronization of a plurality of data streams, the second data offloading component needs to have a data stream transmission control function. Optionally, the second data offloading component further has a stream control function and/or a sorting function.

Further, other auxiliary information of a packet, for example, the SN of the packet and information indicating the retransmission or the initial transmission of the packet, may further be transferred between the second data offloading component and the first data offloading component.

The second feedback processing component communicates with the first data multi-stream function component of the sending terminal and/or the receiving terminal on a data transmission status, including collecting or sending data transmission status information from or to the first data multi-stream function component of the sending terminal and/or the receiving terminal, collects a data transmission status from the second data transfer component and optionally provides proper data feedback information to the second data transfer component for data transmission. The data transmission status fed back includes: indication indicating whether or not a packet is successfully sent or received, the delay information of a packet and the number information of a data PDU.

The second data transfer component transmits data with a low-layer protocol and optionally feeds back a data transmission status to the second feedback processing component. The data transmission status includes: indication indicating whether or not a packet is successfully sent or received, the delay information of a packet and the number information of a data PDU.

Specifically, the relationship between different functional components may be combined and realized in many ways, for example, as shown in FIG. 8, the first data offloading component offloads downlink data according to an instruction from the first offloading strategy component, processes part of the data using the first data processing component, transfers the processed data to a low-level layer through the first data transfer component and sends the data processed by the low-level layer to a UE and on the other hand, transfers the other part of data to the second data multi-stream function component, processes the other part of data using the second data offloading component and the second data processing component, transfers the processed data to the low-level layer through the second data transfer component and sends the data processed by the low-level layer to the UE, thereby realizing the multi-stream transmission of data.

Meanwhile, the second feedback processing component collects feedback information of the node where the second feedback processing component is located or the first data multi-stream function component, provides the feedback information to the second data transfer component for data transmission and synchronously sends the data transmission status of the node where the second feedback processing component to the first data multi-stream function component. The first feedback processing component collects feedback information of the node where the first feedback processing component is located or the second data multi-stream function component and respectively transfers a data transmission status to the first data transfer component and the first offloading strategy component.

Figure 9:
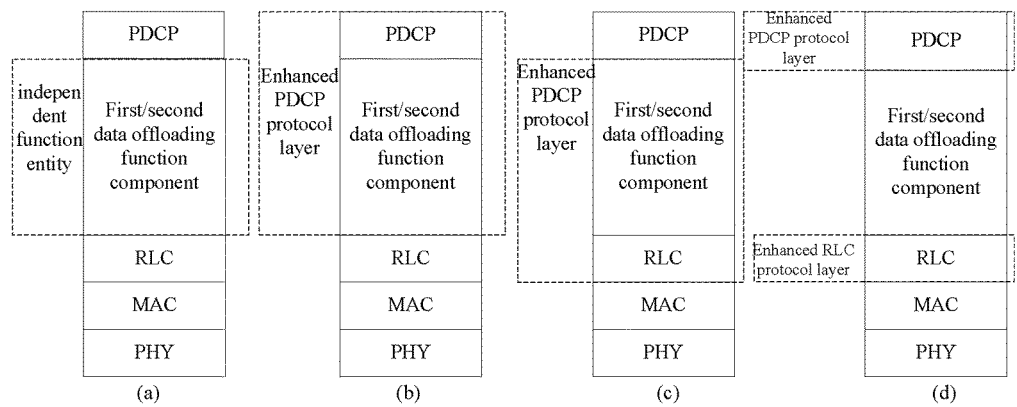
FIG. 9 is a schematic diagram illustrating the relationship between a data multi-stream function and an existing protocol stack according to a preferred embodiment of the disclosure.

Refer to FIG. 9 which is a schematic diagram illustrating the relationship between a data multi-stream function and an existing protocol stack according to a preferred embodiment of the disclosure, in the actual application, the functions of the data multi-stream function components may correspond to an independent protocol entity (as shown in FIG. 9a) or be integrated in the PDCP sub-layer function of an existing protocol (as shown in FIG. 9b) or in the functions of existing RLC sub-layer protocol functions (as shown in FIG. 9c) or realized in the foregoing three manners together (as shown in FIG. 9d).

Further, for downlink data, the sending terminal is a network side, and the receiving terminal is a UE.

Further, for uplink data, the sending terminal is a UE, and the receiving terminal is a network side (RAN).

Further, at the network side, the first connection is terminated at a first network node, and the second connection is terminated at a second network node. On the UE side, the first connection and the second connection are both terminated at a UE node. The first connection refers to the connection established between a UE and the first network node, and the second connection refers to the connection established between the UE and the second network node.

Further, the first network node and the second network node refer to network element nodes of a wireless access network in an LTE network, for example, evolved Node Bases (eNB), evolved Home Node Bases (HeNBs) or other LPN nodes.

Preferred Embodiment 1

Figure 10:
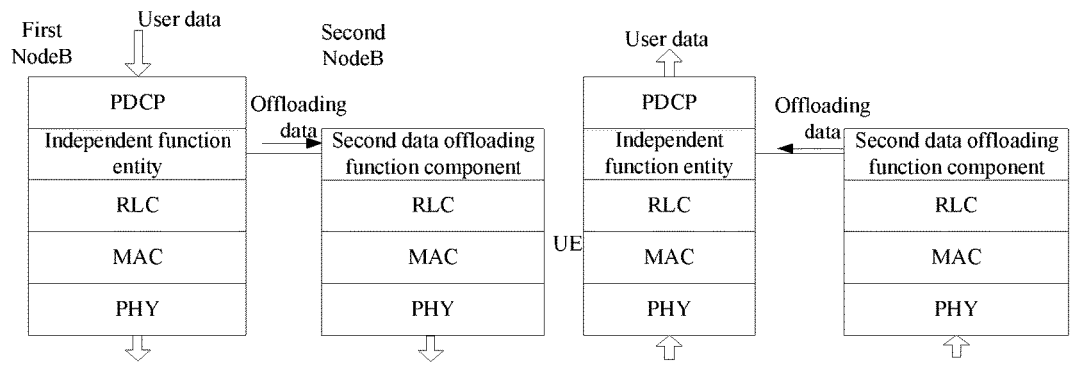
FIG. 10 is a flowchart illustrating data multi-stream transmission according to a preferred embodiment 1 of the disclosure.

FIG. 10 is a schematic diagram illustrating data multi-stream transmission according to a preferred embodiment 1 of the disclosure, as shown in FIG. 10, taking the offloading of downlink data as example, the user plane data of a UE is offloaded by the data offloading component of a first NodeB, and the offloading data is totally sent to a small cell in a second NodeB and then to a user terminal. The user terminal combines the data received by the first NodeB with that received by the second NodeB to obtain the final user data.

1: the first NodeB receives downlink user data from a core network, and the offloading strategy component determines to offload all the user data to a small cell on the second NodeB according to the current network load, the radio signal quality of the cell where the UE exists and a neighbor cell contained in a measurement report reported by the UE and the Quality of Service (QoS) information.

2: the data offloading component of the first NodeB transfers the user data to the second NodeB according to an instruction from the offloading strategy component; before the offloading data is transferred, the data processing component of the first NodeB further processes offloading data, the processing including: assigning a Sequence Number (SN) to a downlink packet, encrypting the packet and adding a packet head. The specific realization of the processing may be the same as that of corresponding functions of existing PDCP sub-layer and is therefore not described repeatedly.

3: after receiving the offloaded PDCP PDU data, the second NodeB caches the data, sends the data to low-layer (including an RLC layer, an MAC layer and a PHY layer) for processing, and finally sends the data to the UE.

4: after receiving data using the low-layer, protocol, that is the RLC protocol, of the second NodeB, the second data multi-stream processing component at the UE side sends the data to the first data multi-stream processing component of the UE to combine the received data into PDCP PDU, thereby finally obtaining the originally sent data.

Further, the added multi-stream function component may enhance existing protocols in many ways, for example, in the way shown in FIG. 9.

Preferred Embodiment 2

Figure 11:
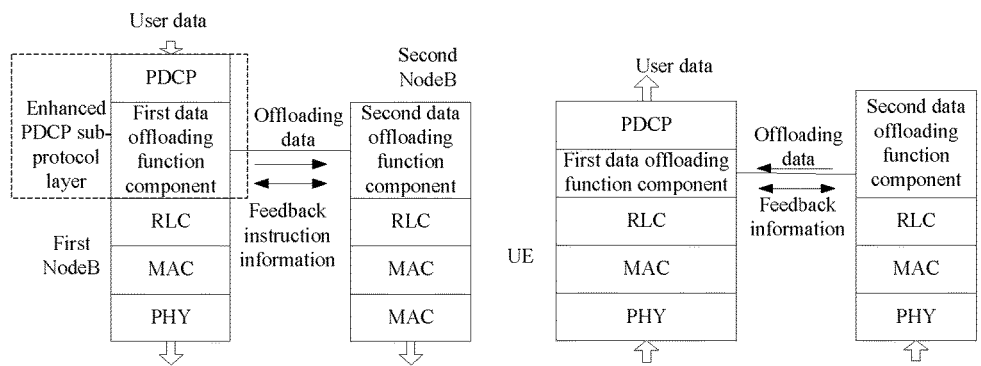
FIG. 11 is a flowchart illustrating data multi-stream transmission according to a preferred embodiment 2 of the disclosure.

FIG. 11 is a schematic diagram illustrating data multi-stream transmission according to a preferred embodiment 2 of the disclosure, and as shown in FIG. 11, taking the offloading of downlink data as example. As a part of a PDCP protocol layer having an enhanced function, a data multi-stream function component completes the offloading of user data at the data offloading component of a first NodeB, sends part of the data to a second NodeB and synchronously provides downlink data transmission for the UE through the first NodeB and the second NodeB to realize multi-stream transmission. Meanwhile, the feedback processing components of the two NodeBs communicate with each other on feedback information. The user terminal combines the data received by the first NodeB with that received by the second NodeB to obtain the final user data.

1: the first NodeB receives downlink user data from a core network, and the offloading strategy component determines to offload part of the user data to the second NodeB according to the current network load, the radio signal quality of the cell where the UE exists and a neighbor cell contained in a measurement report reported by the UE, QoS information and the feedback information received by the feedback processing component, for example, the offloading strategy component determines to offload a certain proportion of data packets to the second NodeB and send the other data still from the first NodeB.

2. The data offloading component of the first NodeB transfers part of the protocol data packets (PDU) processed by the PDCP layer to the second NodeB according to an instruction from the offloading strategy component and the other part of data to the low-layer with low-layer protocol (that is, an RLC layer, an MAC layer and a PHY layer) stack of the first NodeB, and finally sends the other part of data to the UE. The processing carried out by the PDCP protocol sub-layer of the first NodeB for the data includes: assigning an SN to a downlink packet, encrypting the packet and adding a head for the packet.

Further, the PDCP PDU transfer between the first NodeB and the second NodeB may be realized using existing GTP-U tunneling protocols or other existing protocols, and the PDCP PDU is used as effective load data of a transmission protocol.

3: after receiving the offloaded PDCP PDU data, the second NodeB caches the data and sends the data to low-layer with low-layer protocol (including an RLC layer, an MAC layer and a PHY layer) for processing, and finally sends the data to the UE.

4: during the sending process of the second NodeB, the feedback processing component of the second NodeB collects the sending status of the data, for example, information on whether or not the data is successfully sent and the delay of a packet, and sends the information to the feedback processing component of the first NodeB periodically or as required.

The feedback information may be transferred through a low-layer connection, for example, a GTP-U tunnel after being packed in the form of a PDCP status report.

5: the data received by the UE from the first NodeB and the second NodeB and the RLC SDU data sent from the low-layer are respectively processed by the data processing component and combined into one data stream, thereby finally obtaining PDCP PDU data. The UE periodically sends data receiving status information to the first NodeB. The processing implemented by the user data processing component may include: unpacking a packet, sorting packets, decrypting packets and decompressing packets.

Optionally, the feedback information may also be sent to the second NodeB, depending on the actual implementation method.

6: the first NodeB updates the offloading strategy in real time according to the feedback information collected by the feedback processing component thereof. The feedback information received by the feedback processing component of the first NodeB may be the feedback information of the lower-layer protocol of the data multi-stream processing component of the first NodeB, for example, the feedback of an RLC layer, and/or the feedback information of the second NodeB and/or the feedback information on a UE side.

Optionally, the first NodeB informs the UE of the offloading strategy information of the offloading strategy component for the UE to know the offloading way of downlink data in real time to receive data conveniently.

Further, the added multi-stream function component may enhance existing protocols in many ways, for example, in the way shown in FIG. 9.

Preferred Embodiment 3

Figure 12:
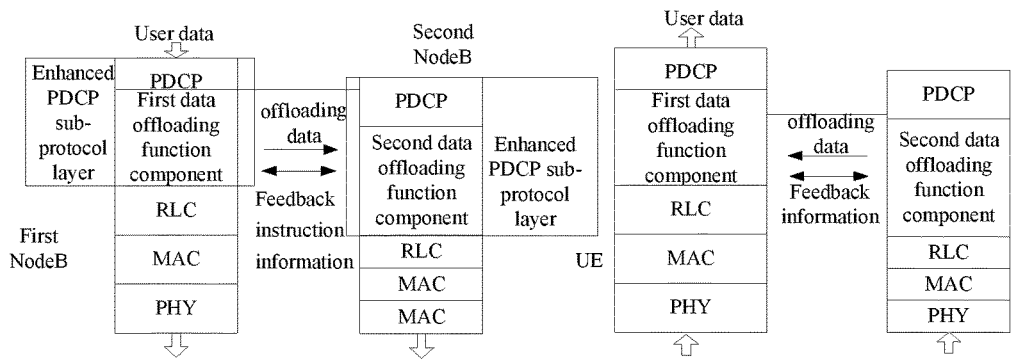
FIG. 12 is a flowchart illustrating data multi-stream transmission according to a preferred embodiment 3 of the disclosure.

FIG. 12 is a schematic diagram illustrating data multi-stream transmission according to a preferred embodiment 3 of the disclosure, and as shown in FIG. 12, taking the offloading of downlink data as example, as a part of a PDCP protocol layer having an enhanced function, a data multi-stream function component completes the offloading of user data at the data offloading component of a first NodeB, sends part of the offloading data to a second NodeB, and the data offloading component of the second NodeB processes the data received and then sends the processed data to a user terminal, thereby realizing multi-stream transmission. Meanwhile, the feedback processing components of the two NodeBs communicate with each other on feedback information. The user terminal combines the data received by the first NodeB with that received by the second NodeB to obtain the final user data.

1: the first NodeB receives downlink user data from a core network, the offloading strategy component determines to offload part of the user data to the second NodeB according to the current network load, the radio signal quality of the cell where the UE exists and a neighbor cell contained in a measurement report reported by the UE, QoS information and the feedback information received by the feedback processing component, for example, the offloading strategy component determines to offload a certain proportion of data packets to the second NodeB and send the other data still from the first NodeB.

2: the data offloading component of the first NodeB transfers a part of the protocol packets (PDU) processed in a PDCP layer to the first data processing component for processing according to an instruction from the offloading strategy component. The processing carried out by the PDCP protocol sub-layer of the first NodeB for the data includes: assigning an SN to a downlink packet, encrypting the packet and adding a head for the packet.

3: the first data processing component processes the received offloading data, including reassigning a sub-sequence number to the data, adding a packet head to the data and optionally re-encrypting the data, sends the repacked new PDCP packet to a low-layer protocol stack and sends the PDCP packet processed by the low-layer protocol stack to the UE. Optionally, an indicating bit may be added in the head of the protocol packet in order to distinguish two layers of PDCP packet heads.

4: the first NodeB sends the other PDCP PDU data stream to the second NodeB, wherein the packet transfer between the first NodeB and the second NodeB may be realized through existing GTP-U tunneling protocol or other existing protocols, and the offloading data is used as effective load data of a transmission protocol.

5: after the second NodeB receives the offloaded PDCP PDU data, the PDCP layer of the second NodeB reassigns an SN to the data, adds another layer of packet head, and sends the re-processed new PDCP packet to the low-layer protocol stack through the second data multi-stream function component and finally sends the PDCP packet to the UE. Optionally, an indicating bit may be added in the head of the protocol packet in order to distinguish two layers of PDCP packet heads.

6: during the sending process of the second NodeB, the feedback processing component of the second NodeB collects the sending status of the data, for example, information on whether or not the data is successfully sent and the delay of a packet, and sends the information to the feedback processing component of the first NodeB periodically or as required.

7: the UE first sorts, decompresses and unpacks the low-layer protocol data received from the first NodeB and the second NodeB according to outer PDCP packet heads and combines the processed data into a PDCP PDU data stream and then unpacks and decompresses the data again to finally obtain the user data.

8: optionally, the UE periodically sends data receiving status information to the first NodeB and the second NodeB to indicate the receiving status of the new PDCP packet, wherein the information may be fed back in the form of a PDCP status report, depending upon the actual implementation mode.

9: the first NodeB updates the offloading strategy in real time according to the feedback information collected by the feedback processing component of the NodeB. The feedback information received from the feedback processing component of the NodeB may be the feedback information of the lower-layer protocol of the data multi-stream processing component of the first NodeB, for example, the feedback of an RLC layer, or the feedback information of the second NodeB or the feedback information of a UE side.

Optionally, the first NodeB informs the UE of the offloading strategy information of the offloading strategy component for the UE to know the offloading way of downlink data in real time to receive data conveniently.

Further, the added multi-stream function component may enhance existing protocols in many ways, for example, in the way shown in FIG. 9.

Preferred Embodiment 4

Figure 13:
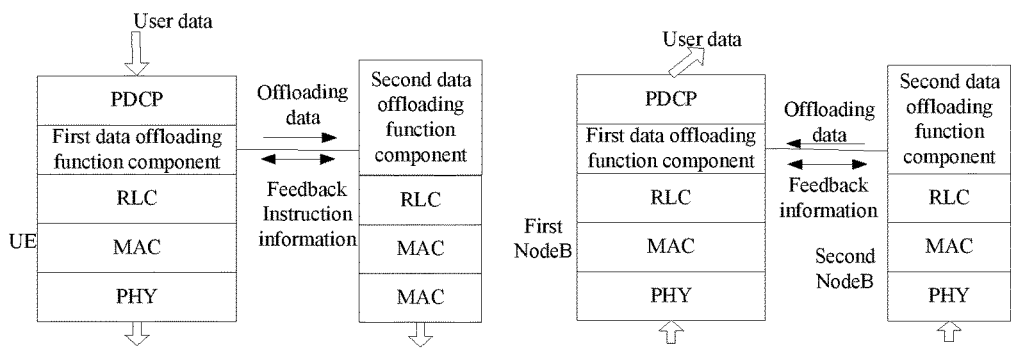
FIG. 13 is a flowchart illustrating data multi-stream transmission according to a preferred embodiment 4 of the disclosure.

FIG. 13 is a schematic diagram illustrating data multi-stream transmission according to a preferred embodiment 4 of the disclosure, and as shown in FIG. 13, taking the offloading of uplink data as example, the sending terminal is a UE, and the receiving terminal is a network side. A data multi-stream function component serves as a part of a PDCP protocol layer having an enhanced function, and the UE offloads user data using the first data offloading component and respectively sends the offloading data to the first NodeB and the second NodeB, after receiving the data, the second NodeB sends the received offloading data to the first NodeB to combine data streams, thereby realizing the multi-stream transfer of uplink; meanwhile, the feedback processing components of the two NodeBs communicate with each other on feedback information. The second NodeB sends the received user data to the first NodeB, and the first NodeB combines the data received from the UE with that received from the second NodeB to obtain the final user data.

1: when uplink data is transmitted to a UE, the offloading strategy component determines to offload part of the user data to the second NodeB according to radio signal quality of the cells of the first NodeB and the second NodeB in the current network and QoS information or according to an offloading strategy specified by the network side, for example, the offloading strategy component determines to offload a given proportion of packets to the second NodeB and still send the other part of data to the first NodeB.

2: the first data offloading component of the UE transfers a part of the PDUs processed in a PDCP layer to the first data processing component for processing according to an instruction from the offloading strategy component. The processing carried out by the PDCP protocol sub-layer of the first NodeB for the data includes: assigning an SN to a downlink packet, encrypting the packet and adding a head for the packet. The UE sends the packed packet to a low-layer protocol stack and sends the packet processed by the low-layer protocol stack to the first NodeB.

3: The UE sends the other PDCP PDU data stream to the second data offloading component, sends the data stream processed (e.g. cached) by the second data processing component to the low-layer protocol stack through the second data transfer component, and finally sends the data stream to the second NodeB.

4: during the data sending process of the UE, the first feedback processing component of the UE respectively collects data sending status information from the first data transfer component and the second data transfer component and provides the information to the offloading strategy component for the offloading strategy component to update the offloading stratagem in real time.

5: after the second NodeB receives the low-layer protocol data (that is, RLC SDU) from the UE, the second data processing component processes the low-layer protocol data to obtain PDCP PDU and sends the obtained PDCP PDU to the first data multi-stream function component.

6: the first NodeB uniformly sorts the packet received from the UE side and the PDCP PDU packet received from the second NodeB and combines the received packets into a data stream, thereby finally obtaining the user data.

7: optionally, the second NodeB periodically sends data receiving status information to the first NodeB or the UE to indicate the receiving status of the new PDCP packet, wherein the information may be fed back in the form of a PDCP status report, depending upon the actual implementation mode.

Optionally, the UE may inform the first NodeB of the offloading strategy information of the offloading strategy component for the first NodeB to know the offloading way of uplink data in real time to receive data conveniently.

Further, the added multi-stream function component may enhance existing protocols in many ways, for example, in the way shown in FIG. 9.

By partially or totally offloading the PDU data to be transmitted on a first connection between a sending terminal and a receiving terminal to a second connection between the sending terminal and the receiving terminal and carrying out a data multi-stream processing for the offloading PDU data in a PDCP layer and transparently sending the processed PDU data to a low-level layer through the sending terminal and sending the offloaded PDU data to the receiving terminal through the second connection, the data multi-stream transmission method and device provided in the foregoing embodiments or preferred embodiments address the problem existing in the conventional art that the data throughout of a user is reduced and system resources are congested due to the increase of the LPN cells deployed by the operator or individuals and sequentially guarantee the continuity of data services through the offloading of user data to another connection and improve the data service performance of the user and user experience.

It can be seen from the description above that the disclosure achieves the following technical effects: the multi-stream transmission method provided herein frees the connection between a network side and a terminal from the transmission performance of a single link and enables the flexible scheduling of the data offloading between a network side and a UE according to a network environment or a resource situation. When the UE is frequently switched among small cells, user data can be offloaded to another connection, thus guaranteeing the continuity of data services and improving the performance of data services of user and user experience. Meanwhile, the service handover of a service connection among a plurality of streams can be realized by changing a user plane connection, thus relieving the signaling impact on the control plane of a network.

INDUSTRIAL APPLICABILITY

The technical solution of the disclosure enables the flexible scheduling of the data offloading between a network side and a UE according to a network environment or a resource situation and the offloading of user data to another connection when a UE is frequently switched among small cells, thus guaranteeing the continuity of data services.

Apparently, it should be appreciated by those skilled in the art that each component or step described in the invention can be realized by a universal computer and that the components or steps may be integrated on a single computer or distributed on a network consisting of a plurality of computers, optionally, the components or steps may be realized by executable program codes so that the components or steps can be stored in a memory to be executed by a computer, and in some cases, the steps shown or described herein can be executed in a sequence different from this presented herein, or the components or steps are formed into integrated circuit components, or several of the components or steps are formed into integrated circuit components. Therefore, the invention is not limited to the combination of specific hardware and software.

The mentioned above is only preferred embodiments of the invention but not limitation to the invention, it should be appreciated that various modification and variations can be devised by those of ordinary skill in the art. Any modification, substitute or improvement devised without departing from the spirit and scope of the disclosure should fall within the protection range of the disclosure.

What is claimed is:

1. A data multi-stream transmission method, comprising:
determining, by a sending terminal, an offloading way of offloading Protocol Data Unit (PDU) data of a Packet Data Convergence Protocol (PDCP) layer according to an offloading strategy;
offloading, by the sending terminal, all or part of the PDU data as offloading data from a first connection to a second connection according to the offloading way, wherein the first connection and the second connection are both connections between the sending terminal and a receiving terminal; and
implementing, by the sending terminal, a data multi-stream processing on the offloading data in the PDCP layer, forwarding, by the sending terminal, the processed offloading data to a low-level layer for processing, and sending, by the sending terminal, other PDU data, in the PDU data, except for the offloading data to the receiving terminal through the first connection and the processed offloading data to the receiving terminal through the second connection;
wherein after the sending terminal sends the other PDU data, in the PDU data, except for the offloading data to the receiving terminal through the first connection and the processed offloading data to the receiving terminal through the second connection, the method further comprises:
collecting, by the sending terminal, sending status information about sending data on the first connection and/or the second connection, the sending status information including: sequence number of a packet, indication information indicating whether or not the packet is successfully sent and delay information about sending the packet;
wherein after the sending terminal sends the other PDU data, in the PDU data, except for the offloading data to the receiving terminal through the first connection and the processed offloading data to the receiving terminal through the second connection, the method further comprises:
receiving, by the sending terminal, receiving status information which is sent by the receiving terminal through the first connection and/or the second connection and indicates a data receiving status, the receiving status information including: sequence number of a packet and indication information indicating whether or not the packet is successfully received.

2. The method according to claim 1, wherein implementing, by the sending terminal, the data multi-stream processing on the offloading data comprises: caching data, repacking data in a specified way, assigning a sequence number to a packet, encrypting data, protecting integrity, compressing data and adding a packet head.

3. The method according to claim 2, wherein after the sending terminal sends the other PDU data, in the PDU data, except for the offloading data to the receiving terminal through the first connection and the processed offloading data to the receiving terminal through the second connection, the method further comprises:
Implementing, by the receiving terminal, a data multi-stream processing on the processed offloading data and the other PDU data received, wherein the data multi-stream processing implemented by the receiving terminal on the processed offloading data and the other PDU data comprises: caching data, sorting data in a specified manner, assigning a sequence number to a packet, decrypting data, protecting integrity, decompressing data and removing a packet head.

4. The method according to claim 1, wherein
the offloading strategy includes: indication indicating whether or not to offload the PDU data, indication indicating assignment of the other PDU data to the first connection and indication indicating assignment of the offloading data to the second connection, and
the offloading strategy is made by the sending terminal according to following information: feedback information collected by a network node where the sending terminal is located or by the receiving terminal and information related to connections and resources.

5. The method according to claim 4, wherein after the sending terminal determines the offloading way of offloading the PDU data of the PDCP layer according to the offloading strategy, the method further comprises:
sending, by the sending terminal, the offloading strategy to the receiving terminal.

6. The method according to claim 1, wherein
the offloading strategy includes: indication indicating whether or not to offload the PDU data, indication indicating assignment of the other PDU data to the first connection and indication indicating assignment of the offloading data to the second connection, and
the offloading strategy is made by the sending terminal according to following information: feedback information collected by a network node where the sending terminal is located or by the receiving terminal and information related to connections and resources.

7. The method according to claim 6, wherein after the sending terminal determines the offloading way of offloading the PDU data of the PDCP layer according to the offloading strategy, the method further comprises:
sending, by the sending terminal, the offloading strategy to the receiving terminal.

8. A data multi-stream transmission device, comprising:
a determination component, connected with an offloading component and configured to determine an offloading way of offloading Protocol Data Unit (PDU) data of a Packet Data Convergence Protocol (PDCP) layer according to an offloading strategy;
the offloading component, connected with a processing component and configured to offload all or part of the PDU data as offloading data from a first connection to a second connection according to the offloading way, wherein the first connection and the second connection are both connections between the sending terminal and a receiving terminal; and
the processing component, connected with a first sending component and configured to implement a data multi-stream processing on the offloading data in the PDCP layer and forward the processed offloading data to a low-level layer for processing; and
the first sending component, connected with a collection component and a receiving component, and configured to send other PDU data, in the PDU data, except for the offloading data to the receiving terminal through the first connection and the processed offloading data to the receiving terminal through the second connection after the processing component completes the processing in the low-level layer;
wherein the device further comprises:
the collection component, connected with the first sending component and configured to collect, after the first sending component sends the other PDU data and the processed offloading data to the receiving terminal, sending status information about sending data on the first connection and/or the second connection, the sending status information comprising: sequence number of a packet, indication information indicating whether or not the packet is successfully sent and delay information about sending the packet;
the receiving component, connected with the first sending component and configured to receive, after the first sending component sends the other PDU data and the processed offloading data to the receiving terminal, receiving status information which is sent by the receiving terminal through the first connection and/or the second connection and indicates a data receiving status, the receiving status information comprising: sequence number of a packet and indication information indicating whether or not the packet is successfully received.

9. The device according to claim 8, wherein the data multi-stream processing implemented by the processing component on the offloading data comprises: caching data, repacking data in a specified way, assigning a sequence number to a packet, encrypting data, protecting integrity, compressing data and adding a packet head.

10. The device according to claim 8, wherein
the offloading strategy comprises indication indicating whether or not to offload the PDU data, indication indicating assignment of the other PDU data to the first connection and indication indicating assignment of the offloading data to the second connection, and
the offloading strategy is made by the sending terminal according to following information: feedback information collected by a network node where the sending terminal is located or by the receiving terminal and information related to connections and resources.

11. The device according to claim 10, further comprising:
a second sending component configured to send the offloading strategy to the receiving terminal after the determination component determines the offloading way according to the offloading strategy.

12. A data multi-stream transmission device located at a receiving terminal, comprising:
a receiving component configured to receive, after a sending terminal determines an offloading way of offloading Protocol Data Unit (PDU) data of a Packet Data Convergence Protocol (PDCP) layer according to an offloading strategy, offloads all or part of the PDU data as offloading data from a first connection to a second connection according to the offloading way, implements a data multi-stream processing on the offloading data in the PDCP layer and forwards the processed offloading data to a low-level layer for processing, the other PDU data, in the PDU data, except for the offloading data, sent by the sending terminal through the first connection, and the processed offloading data sent by the sending terminal through the second connection,
wherein the first connection and the second connection are both connections between the sending terminal and the receiving terminal;
wherein the device further comprises:
a sending component configured to send, after the receiving component receives the other PDU data and the processed offloading data, receiving status information indicating a data receiving status the sending terminal through the first connection and/or the second connection, the receiving status information comprising:

sequence number of a packet and indication information indicating whether or not the packet is successfully received.

13. The device according to claim 12, wherein
the offloading strategy includes: indication indicating whether or not to offload the PDU data, indication indicating assignment of the other PDU data to the first connection and indication indicating assignment of the offloading data to the second connection;
wherein the offloading strategy is made by the sending terminal according to following information: feedback information collected by the network node where the sending terminal is located or by the receiving terminal and information related to connections and resources.

14. The device according to claim 13, wherein
the receiving component is further configured to receive the offloading strategy sent from the sending terminal after the sending terminal determines a offloading way according to the offloading strategy.

\* \* \* \* \*